United States Patent [19]

Zias et al.

[11] 4,051,712

[45] Oct. 4, 1977

[54] PRESSURE TRANSDUCER AUTO REFERENCE

[75] Inventors: Arthur R. Zias, Los Altos; Duane R. Tandeske, Pleasanton, both of Calif.

[73] Assignee: National Semiconductor Corporation, Santa Clara, Calif.

[21] Appl. No.: 716,316

[22] Filed: Aug. 20, 1976

[51] Int. Cl.² .............................................. G01L 27/00
[52] U.S. Cl. ..................................................... 73/4 R
[58] Field of Search .......................... 73/1 R, 1 B, 4 R

[56] References Cited

U.S. PATENT DOCUMENTS

| | | | |
|---|---|---|---|
| 3,689,748 | 9/1972 | Bothne | 73/4 R |
| 3,740,533 | 6/1973 | Zeggelaar | 73/4 R |

Primary Examiner—S. Clement Swisher
Attorney, Agent, or Firm—Gail W. Woodward; Willis E. Higgins

[57] ABSTRACT

A pressure transducer is automatically calibrated electronically by periodically subjecting the transducer to a reference pressure for a brief period of time. During this period of time the transducer electrical output is automatically adjusted to a level that represents the desired value for the reference pressure. The calibration can be accomplished just prior to taking a measurement or it can be accomplished at regular intervals spaced to ensure the accuracy of readings taken between calibrations.

10 Claims, 6 Drawing Figures

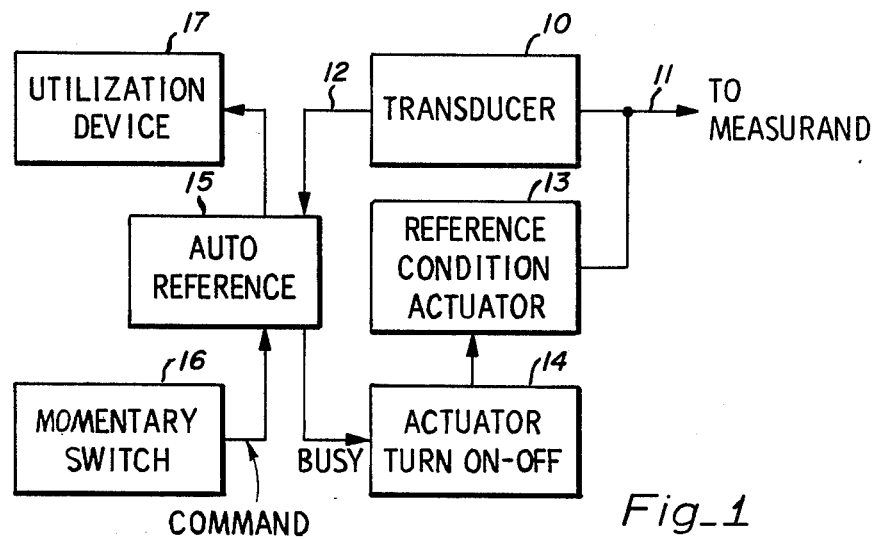
Fig_1
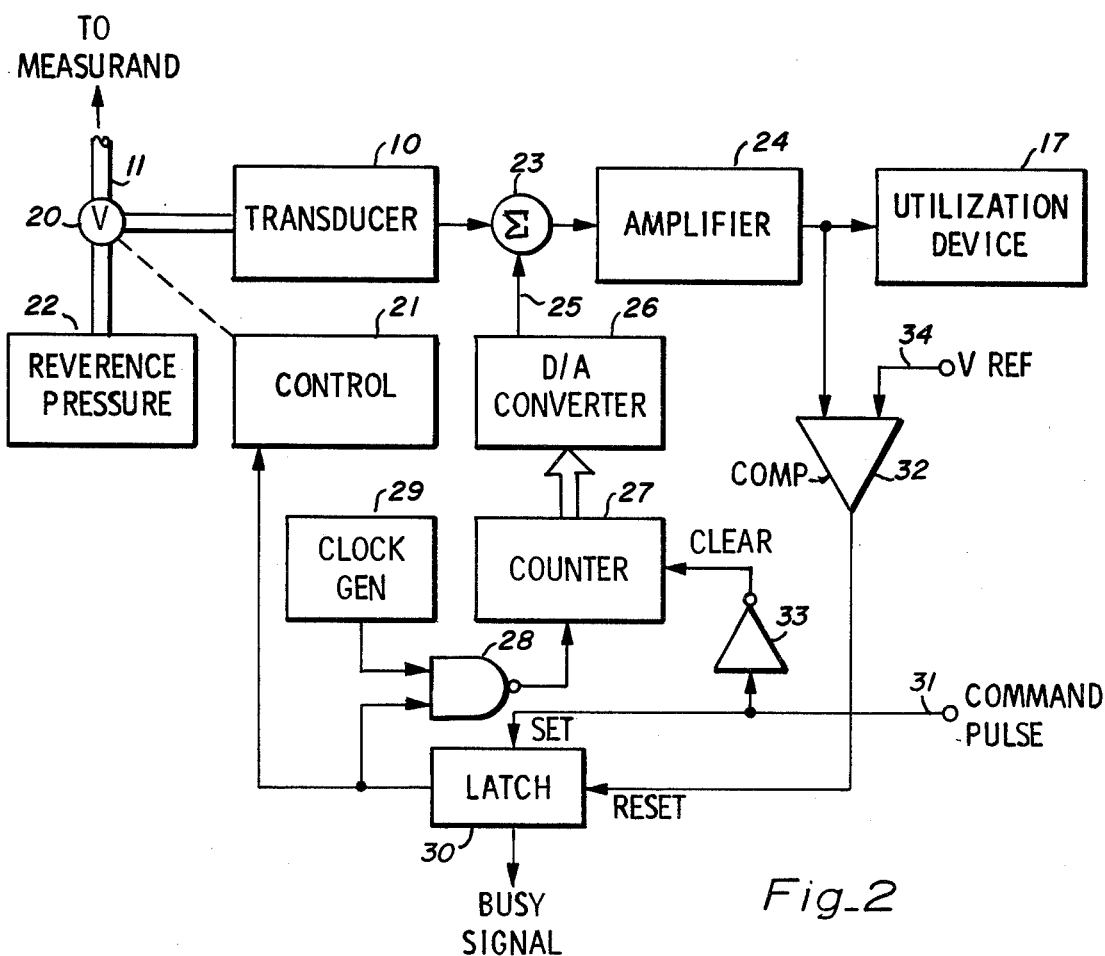
Fig_2

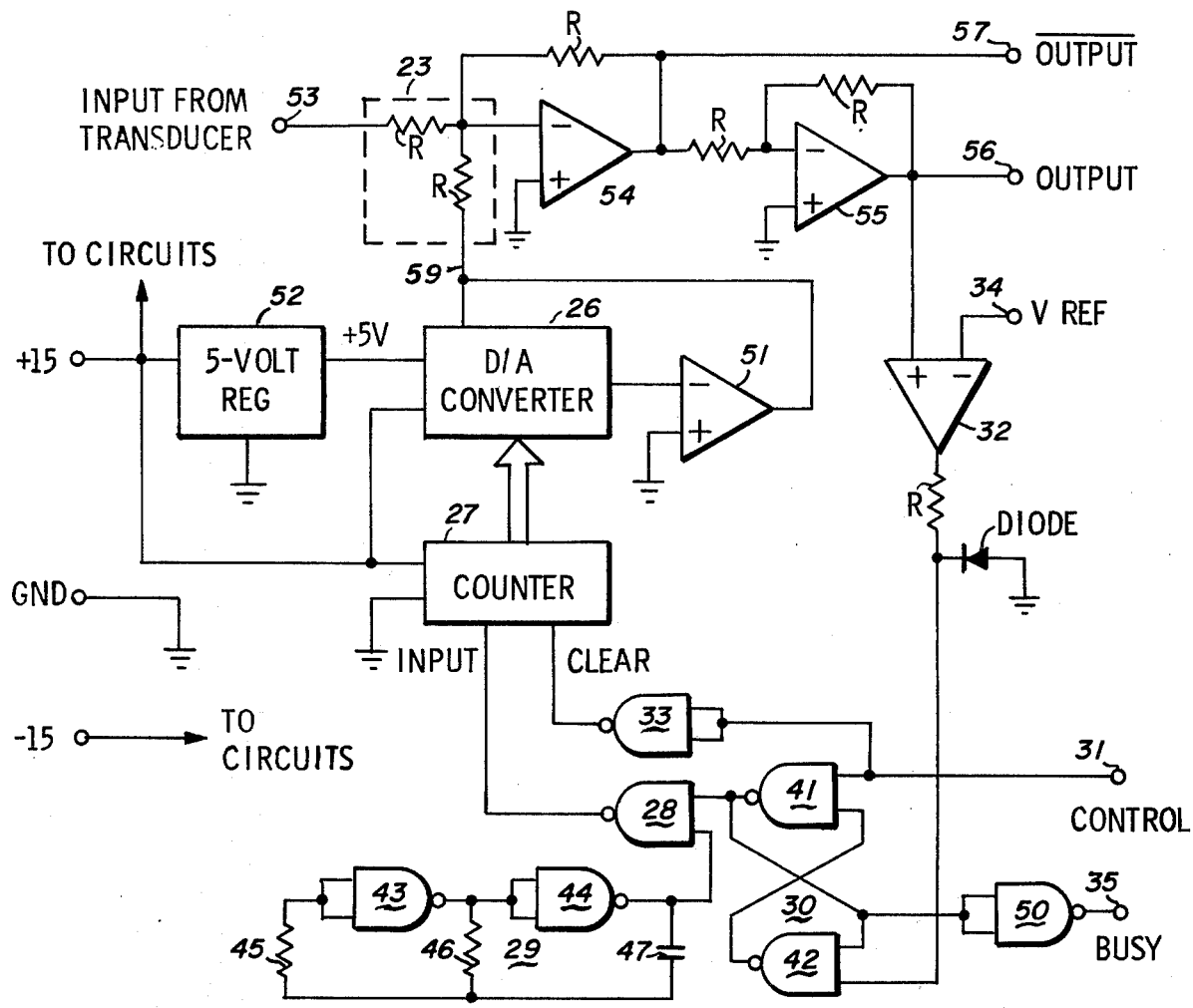
Fig_3
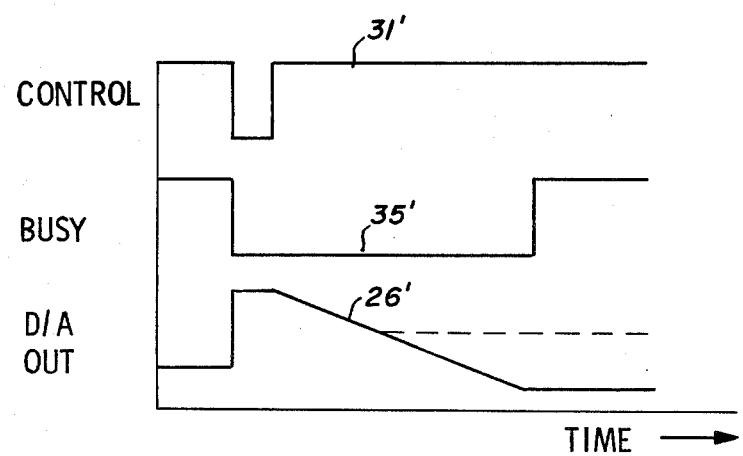
Fig_4

U.S. Patent    Oct. 4, 1977    Sheet 3 of 3    4,051,712
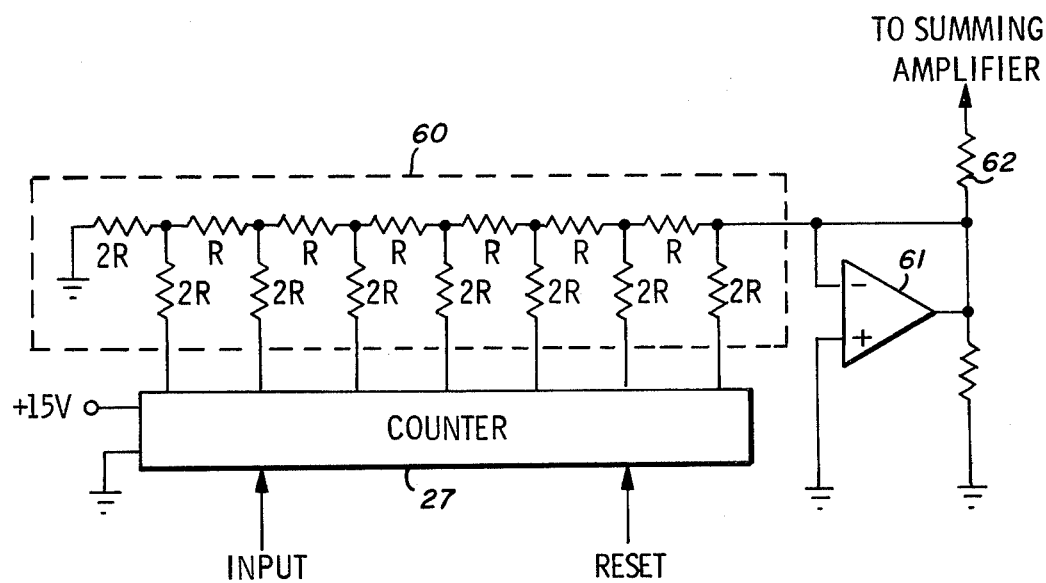
Fig_5
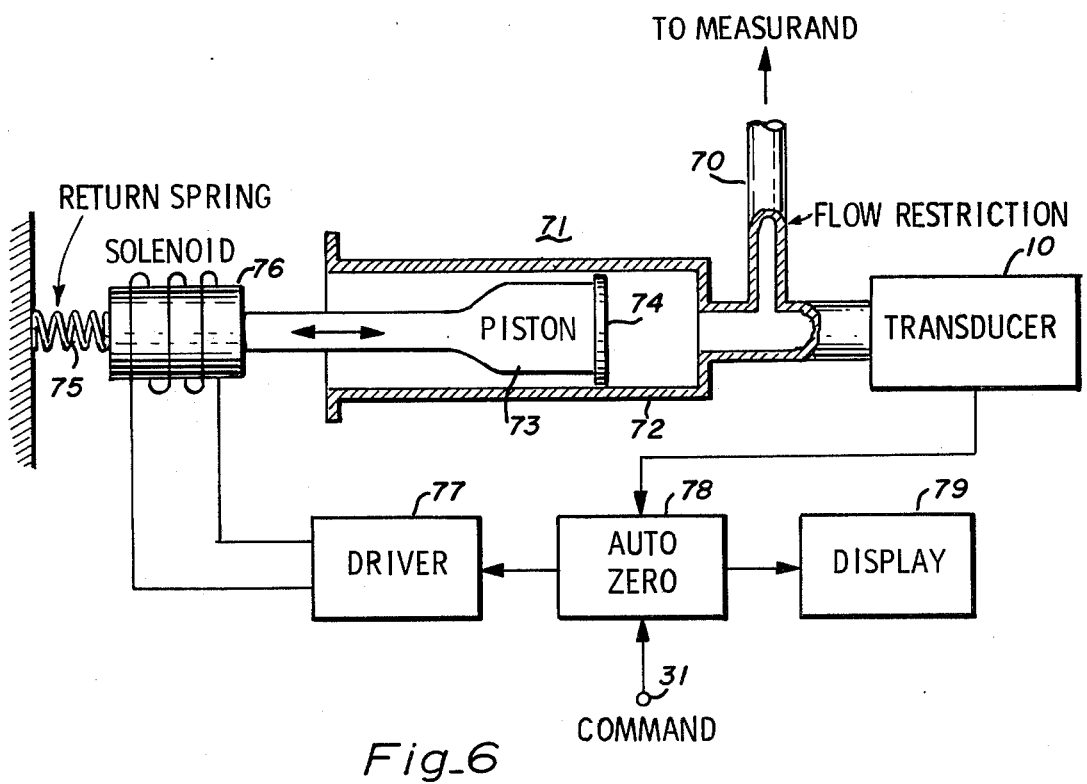
Fig_6

PRESSURE TRANSDUCER AUTO REFERENCE

BACKGROUND OF THE INVENTION

Pressure transducers have been miniaturized and improved to a point where precise readings of pressure are converted to an analog voltage in a device that is very reliable and rugged. In addition, modern devices are quite small and relatively inexpensive. Accordingly, such devices are used extensively in a wide variety of applications. The analog output voltage can easily be applied to a display or indicator of any desired nature or it can be used to control other devices in response to the pressure conditions. For example, if the pressure readout is for an altimeter application, altitude can be displayed or the analog voltage coupled to the controls of an aircraft. In underwater applications, the pressure can be converted to depth indications and/or control.

In transducer specifications there are three major characteristics: offset, sensitivity, and span. Span refers to the range of voltages representing the pressures. If, for example, a particular fluid transducer covers a pressure range of 0 to 100 psia, and has an output of 2.5 to 12.5 volts, the span is expressed as 10 volts and 100 pounds. This yields 10 pounds per volt sensitivity. Since zero psia is represented by 2.5 volts, the offset is 2.5 volts.

Commercial transducers are available in a wide selection of characteristics. Typically, the span and sensitivity characteristics are not subject to much variation, these being largely established in the device at manufacture. The offset characteristic is the most subject to drift or change. Such changes can occur as either short term, usually ambient condition related, errors or long term, drift-related, errors. since these offset errors affect the accuracy of readings at any pressure, it is essential that they be compensated as much as possible. In the prior art this was done by actual calibration, repeated as often as was regarded as necessary and practical. In effect, accuracy was compromised to whatever degree that could be tolerated in order to make a system practicable. It would be desirable to automate or mechanize calibration so that it can be indulged to whatever extent is deemed useful for accurate readings.

SUMMARY OF THE INVENTION

It is an object of the invention to provide means for the automatic calibration of a pressure transducer.

It is a further object of the invention to use digital control circuitry to generate a variable analog voltage that can be held and periodically reestablished, with the voltage providing a calibration value for a pressure transducer.

It is a feature of the invention that a precision calibration of a pressure transducer can be accomplished automatically as desired.

A pressure transducer is provided with means for establishing a known reference input pressure as desired and the electrical output is provided with a variable calibration voltage. Upon command the reference condition is applied for a brief period to the transducer. An auto reference circuit is also energized during the same brief period. This circuit automatically varies the variable calibration voltage until a reading is obtained that corresponds to the desired transducer reading for the reference pressure. The circuit then maintains this voltage until the next command is received to calibrate. Thus the transducer offset is automatically calibrated as often as desired. In one mode calibration is commanded just prior to taking a reading. This mode is used where relatively infrequent readings are required. Alternatively calibration is commanded at predetermined intervals, with the interval being selected so that any drift trends are avoided. The interval is made long enough so as not to interfere with the desired readings. For example where the pressure transducer is monitoring a continuous process, calibration is accomlished so as to mantain the desired accuracy but is conditioned so that it does not interfere with the process control.

BRIEF DESCRIPTION OF THE DRAWING

FIG. 1 is a block diagram showing the elements of the invention;

FIG. 2 is a detailed block diagram of a system using the invention;

FIG. 3 is a logic diagram showing the details of the electronic portions of FIG. 2;

FIG. 4 is a waveform diagram showing the timing sequence of signals in FIG. 3;

FIG. 5 is an alternative showing of the counter and D/A converter elements of FIG. 3; and FIG. 6 is a partial block diagram with a detailed showing of vacuum auto zero referencing.

DESCRIPTION OF THE INVENTION

In reference to FIG. 1, the block diagram shows the elements of the invention. Transducer 10 is the device to be calibrated. While the invention relates to any transducer that converts a physical quantity into an electrical analog, the specific examples to be given relate to pressure transducers and, more specifically, to fluid pressure transducers. The quantity to be measured, or the measurand, can be applied by way of a fluid conduit 11 coupled into transducer 10. The output on line 12 is an electrical analog voltage related to pressure. For example transducer 10 may produce a 2.5 to 12.5 volt output for an input pressure range of 0 to 100 psia. Another version may produce the same output voltage for pressures over the range of −5 to 15 psig. In the two cases the sensitivities are 0.1 and 0.5 volt per psi respectively.

In the invention a mechanical reference condition actuator 13 is coupled to the input port of transducer 10. When actuated, actuator 13 applies a reference pressure to the transducer. The pressure value is selected to be in the operating range of the transducer. In the above examples of transducers the −5 to 15 psig device would employ a reference pressure in its range. Here the atmosphere or zero psig would serve nicely. In the case of the 0 – 100 psia device, the zero condition could readily be referenced to a vacuum. While the atmosphere could be used in either case, a vacuum condition is most reliable, absolute, and easily obtained as will be discussed hereinafter.

The reference condition is applied for a brief period of time as controlled by way of actuator turn on-off 14 operated from a signal produced in auto reference 15. The calibration sequence is commanded from switch 16 as desired. While switch 16 is shown as a momentary device, it could easily be replaced by an electronic pulse or other signal produced by associated equipment elements. Where the pressure transducer is operated in a process control system, the command will be generated as part of that system.

When the command is received and the transducer subjected to a reference input, auto reference 15 acts to calibrate the output of transducer 10 to the voltage level that should be present for the reference employed. After the calibration is completed, the auto reference 15 by way of actuator 13 returns transducer 10 to its normal input, the measurand. Under these conditions utilization device 17, which could be a display or process monitor input, is restored to its reception of measurand-related values of analog voltage.

Since there are many applications of pressure transducers in many diverse arts, the actual calibration scheme will depend upon a number of considerations. For example, where measurement is read at relatively infrequent intervals, such as would be the case in remote measurement of such things as rainfall, atmospheric pressure, reservoir pressure and the like, the usual practice would be to calibrate just prior to taking a reading. In this case a command sequence would be: 1. Power up. 2. Allow equipment to stabilize. 3. Calibrate. 4. Measure. 5. Power down.

In a process control, calibration will occur in such a way as not to interfere with the basic control system. Here calibration will occur when the process permits and will be done often enough to ensure accurate readings.

FIG. 2 is a block diagram of a typical auto reference system. Transducer 10 is coupled to a valve 20 operated by control 21 which is typically a simple solenoid device driven by a transistor switch (not shown). In its normal positon valve 20 couples transducer 10 to the measurand via conduit 11. In its actuated position valve 20 couples transducer 10 to reference pressure chamber 22. Where the transducer range includes 0 psia, reference pressure 22 will desirably be a vacuum chamber maintained at vacuum by conventional well known means not shown. Other reference pressure values including atmosphere at 0 psig may be used. The actual value is selected to fall within the range of transducer 10.

The output of transducer 10 is coupled by way of summer 23 and amplifier 24 to utilization device 16 as described above. A calibration voltage is also supplied to summer 23 by way of line 25. The calibration voltage on line 25 should be a fixed value that holds between calibrations and is adjusted to a new value at each calibration. Digital to analog (D/A) converter 26 addressed by counter 27 provides such a voltage. So long as the number contained in counter 27 is fixed, the voltage out of converter 26 will remain fixed. The only time the number in counter 27 can vary is when gate 28 allows pulses from clock 29 to pass. This is controlled by latch 30. A command pulse in at terminal 31 wil set latch 30. Reset is accomplished from comparator 32.

The calibration sequence is as follows: The process is started by a command pulse at 31. This pulse sets latch 30 and, by way of inverter 33, clears counter 27 to its zero state. The setting of latch 30 subjects transducer 10 to reference pressure 22 by way of valve 20 and control 21. Latch 30 when set also enables gate 28 so that clock generator 29 supplies pulses to counter 27. As counter 27 responds to clock pulses, the output of converter 26 will vary. Consequently the input to comparator 32 will vary. $V_{REF}$ 34 is preselected to equal the desired output from amplifier 24 when transducer 10 senses reference pressure. Thus when the voltage into comparator 32 reaches $V_{REF}$, it will reset latch 30 and halt the advance of counter 27. At this point, the system is automatically calibrated. The reset latch, by way of control 21 and valve 20, returns the input of transducer 10 to conduit 21. A "busy signal" available at terminal 35 can be used to electrically indicate when the system is in the calibration mode. This can, if desired, be used to prevent utilization device 16 from being confused by the calibration process.

EXAMPLE I

FIG. 3 is a logic diagram of an auto reference system such as would implement the block diagram of FIG. 2. Where applicable common reference numerals are used.

The following major elements were used to construct the diagram of FIG. 3.

D/A CONVERTER 26 — AD-7520 (Analog Devices)
COUNTER 27 — 74C193 (Three used) (National Semiconductor)
NAND GATES — 74COO Quad NAND Gates (Two used) (National Semiconductor)
AMPLIFIERS — LM324 Quad OpAmp (National Semiconductor)
REGULATOR 52 — LM342 (National Semiconductor)
RESISTOR-R — 10 K ohms (6 shown)
DIODE — General Purpose Silicon
RESISTOR 45 — 200 K ohms
RESISTOR 46 — 100 K ohms
CAPACITOR 47 — 0.01 microfarad.

Latch 30 is composed of two NAND gates 41 and 42 and its output operates NAND gate 28. Clock generator 29 is composed of two inverter-connected NAND gates 43 and 44 along with resistors 45 and 46 and capacitor 47. The passive components were selected to operate clock generator 29 at about 500 Hz.

FIG. 4 is a waveform diagram associated with FIG. 3. Waveform 31' represents the command signal applied to control terminal 31. When signal 31' goes low, it sets latch 30 and, by way of inverter connected NAND gate 33, clears counter 27. Setting latch 30 applies pulses from clock generator 29 by way of NAND gate 28 to the input of counter 27. Waveform 35' denotes the action of gate 30 as applied to terminal 35 through inverter connected NAND gate 50. Setting latch 30 drives the "BUSY" output 10W and turns gate 28 on to pass clock pulses. Counter 27 has a 10 line output and was made up of two and one half 4 digit counters operating in the UP mode. When cleared, counter 27 goes to zero and stays there until the control input at 31 goes back to high. At this point the counter is enabled and starts to accumulate a count from clock generator 29. Since 10 lines are present, the count can go to 1024, which will take slightly over two seconds. During the counting interval, converter 26 in conjunction with OP AMP 51 produces a declining voltage, as shown in waveform 26'. Regulator 52 produces a 5-volt output, so that the level of waveform 26' starts high at 5 volts and declines toward a minimum of zero.

In this example, the transducer used was a model LX1420A (National Semiconductor). This device has an output range of +2.5 to 12.5 volts. The auto zero was vacuum referenced at +2.5 volts. Accordingly, $V_{REF}$ at terminal 34 was set at exactly 2.5 volts. While not shown, this was obtained by means of a precision resistor 2:1 voltage divider connected between the regulated +5 volts and ground.

The output of the transducer was applied to terminal 53, which is coupled by way of summer 23 to amplifiers 54 and 55, which in turn couple to output terminal 56.

Since all of the resistors labeled R are the same value, the amplifiers merely invert at unity gain. Thus the output signal at line 56 will follow the input. A complementary output is available at terminal 57.

Since the transducer is vacuum referenced, when its output is at +2.5 volts, (equal to $V_{REF}$) it is precise. However, since clearing counter 27 produced a 5 volt output from converter 26, the voltage at terminal 56 will start high. This means that the output of comparator 32 will be high. As the voltage out of converter 26 declines due to the accumulated count, at some point the voltage at terminal 56 will cross the 2.5 $V_{REF}$ level. At this instant, the output of comparator 32 goes low and resets latch 30, thereby halting the flow of clock pulses to counter 27. If the transducer were precise, the FIG. 4 waveform 26' would level off at 2.5 volts as shown by the dashed line. If the transducer is not precise, it can be seen that the above described action will halt the count when the output on terminal 56 is at +2.5 volts. Thus the ouptut voltage from converter 26 will supply a correction voltage above or below the actual transducer output so as to correct or calibrate the reading. The calibration voltage will remain at the established level until the next command pulse appears at control terminal 31.

The system spans a 5 volt range in a maximum of 1024 steps, thus giving a resolution of about 5 millivolts. This is about 0.1% of the full scale transducer output. If more precision is required, the count can be increased. For example, each line added to the counter 27 — converter 26 combination doubles the resolution and accuracy.

EXAMPLE II

A simpler version of the auto zero device was constructed as shown in FIG. 5. Counter 27 was a model CD4024C. The D/A converter 26 in this case comprises a resistor ladder 60 and OP AMP 61. The resistor value R shown inside ladder 60 was 40K ±1%. The notation 2R means that two 40K ohm series-connected resistors are used. Thus the elements labeled 2R were 80K ohms each. Resistor 62 was 40K ohms and resistor 63 5K ohms. Resistor 62 comprises one resistor of summer 23, as shown in FIG. 3. Since counter 27 has 7 lines, it counts to 128 and the voltage steps out of the amplifier are about 15 millivolts over about a 2 volt range. In this example the range is reduced by about 2½ to 1 and the accuracy is about 3 to 1 poorer than that of EXAMPLE I. However, the device is simpler and cheaper to construct.

DESCRIPTION OF VACUUM AUTO ZERO

In FIG. 6 a self-contained auto zero system is shown. Transducer 10 is coupled to the measurand by way of a low volume restricted flow conduit section 70. Coupled directly to the transducer input is a syringe-like device 71. This includes a cylinder section 72 and piston 73. Fluid seal element 74 serves resiliently to fill the bore of cylinder 72. Normally piston 73 is forced by spring 75 to rest its face against the cylinder outlet. This leaves conduit 70 in communication with transducer 10.

When solenoid 76 is energized by driver 77, the piston is quickly pulled to the left, thus creating a vacuum inside the cylinder. Since flow into this vacuum is restricted by section 70, the vacuum, while transient, can remain long enough for the electronic auto zero to occur. If the cylinder volume is made many times the volume of the transducer fluid port, an adequate vacuum will be sustained for a period of time that is set by the degree of flow restriction. For example, a typical transducer has a port volume of less than 0.5cc. A syringe having only a 50cc volume will produce a good vacuum relative to a 0 – 20 psia transducer. If the flow restriction has a rate of less than 1cc/second, a good vacuum will remain for the two-second interval associated with the electronics of FIG. 3. The auto zero circuitry 78 and display 79 operate as described above. In the normal mode where the transducer input volume is only 0.5cc, the measurement response time is about 0.5 second.

While FIG. 6 shows a restricted flow tube for maintaining a short term vacuum, other equivalents could be used. For example, regular sized conduit could be used and a valve located at the section where conduit 70 joins the syringe. The mechanism that actuates the piston would then be mechanically coupled to the valve. In this arrangement the vacuum would remain until either the piston is returned or inadvertent leaks offset the vacuum. Thus any related time constant could be made long.

Our invention has been described and examples given of the construction of the automatic calibration circuitry. Clearly there are numerous alternatives and equivalents that will occur to a person skilled in the art. For example, while the above descriptions relate to fluid pressure devices, any pressure transducer could be calibrated as shown. The most commonly used such transducer is found in a weighing scale. Here the zero reference of no applied weight is the logical reference. Typically auto zero would be accomplished between weighings, or, more desirably, just prior to a weighing. Therefore it is intended that the invention be limited only by the following claims.

We claim:

1. In an absolute pressure transducer capable of producing an analog potential representative of the absolute value of an applied pressure, means for calibrating said transducer to a standard reference pressure, said calibrating means comprising:
   means for producing upon command a reference pressure for a controlled period of time at said transducer input,
   means for generating a variable calibrating potential during said period of time,
   means responsive to said analog poential and to said calibrating potential to produce an output indication,
   means for producing a reference potential representative of the desired transducer output for said reference pressure, and
   means for stopping the variation in said calibrating potential and holding the calibrating potential fixed when said output indication is equal to said reference potential.

2. The calibrating means of claim 1 wherein said reference pressure is a vacuum, said vacuum representing an absolute pressure of at least below one percent of the full scale transducer pressure indicating value.

3. The calibrating means of claim 1 wherein said reference pressure is the atmosphere.

4. The calibrating means of claim 1 wherein said controlled period of time is commanded to operate at predetermined intervals that precede intervals wherein an accurate pressure measurement is to be taken.

5. The calibrating means of claim 4 wherein said controlled period of time is made to occur at spaced intervals of time with pressure readings being taken as desired between the resulting periods of time.

6. In the process for calibrating a pessure transducer, said transducer comprising means for converting the pressure input into a proportional output potential, the steps comprising:

adding to said output potential a variable calibrating potential to produce a calibrated output potential, upon command temporarily establishing a reference pressure condition at said input, upon said command varying said variable calibrating potential, stopping said varying of said variable calibrating potential when said calibrated output potential reaches a desired potential, holding said variable calibrating potential constant at the level at which it was stopped until a subsequent command orders recalibration, and restoring said input to its measurement state.

7. The process of claim 6 wherein said reference condition is substantially zero and said desired potential is the zero reference of said transducer output.

8. The process of claim 6 wherein said command is given at a time sufficiently in advance of a critical reading to complete said calibration prior to said reading.

9. The process of claim 6 wherein said calibrating is repeated at selected intervals.

10. The process of claim 6 wherein said variable calibrating potential is generated in a digital-to-analog converter that is operated from a digital counter, said command operating to reset said counter, and said stopping acting to halt the advance of said counter.

* * * * *